United States Patent
Sauer et al.

(10) Patent No.: US 11,400,398 B2
(45) Date of Patent: *Aug. 2, 2022

(54) VACUUM CLEANER FILTER BAG MADE FROM RECYCLED PLASTIC

(71) Applicant: Eurofilters N.V., Overpelt (BE)

(72) Inventors: Ralf Sauer, Overpelt (BE); Jan Schultink, Overpelt (BE)

(73) Assignee: EUROFILTERS N.V., Overpelt (BE)

( * ) Notice: Subject to any disclaimer, the term of this patent is extended or adjusted under 35 U.S.C. 154(b) by 237 days.

This patent is subject to a terminal disclaimer.

(21) Appl. No.: 16/084,900

(22) PCT Filed: Mar. 13, 2017

(86) PCT No.: PCT/EP2017/055781
§ 371 (c)(1),
(2) Date: Sep. 13, 2018

(87) PCT Pub. No.: WO2017/157822
PCT Pub. Date: Sep. 21, 2017

(65) Prior Publication Data
US 2019/0075987 A1   Mar. 14, 2019

(30) Foreign Application Priority Data

Mar. 17, 2016 (EP) ..................... 16160921
Mar. 17, 2016 (EP) ..................... 16160922
Jul. 11, 2016 (EP) ..................... 16178856

(51) Int. Cl.
*B01D 39/16* (2006.01)
*B01D 39/18* (2006.01)
*A47L 9/14* (2006.01)

(52) U.S. Cl.
CPC ............. *B01D 39/163* (2013.01); *A47L 9/14* (2013.01); *B01D 39/18* (2013.01); *B01D 2239/0283* (2013.01); *B01D 2239/065* (2013.01)

(58) Field of Classification Search
CPC ........ B01D 39/18; B01D 39/163; A47L 9/14; D04H 1/42
See application file for complete search history.

(56) References Cited

U.S. PATENT DOCUMENTS

| 6,171,369 | B1 | 1/2001 | Schultink et al. | |
|---|---|---|---|---|
| 2002/0042236 | A1* | 4/2002 | Nobuhara | B01D 39/163 |
| | | | | 442/327 |
| 2004/0211160 | A1 | 10/2004 | Rammig et al. | |
| 2007/0175817 | A1 | 8/2007 | Goldman | |
| 2009/0031683 | A1* | 2/2009 | Schultink | A47L 9/14 |
| | | | | 55/382 |
| 2009/0223190 | A1* | 9/2009 | Nauta | D04H 1/64 |
| | | | | 55/524 |
| 2011/0030557 | A1 | 2/2011 | Brownstein et al. | |
| 2012/0131890 | A1* | 5/2012 | Schultink | A47L 9/14 |
| | | | | 55/368 |
| 2012/0211625 | A1* | 8/2012 | Schultink | A47L 9/1445 |
| | | | | 248/311.2 |
| 2014/0120322 | A1 | 5/2014 | Fu et al. | |

FOREIGN PATENT DOCUMENTS

| CN | 101684634 A | 3/2010 |
|---|---|---|
| CN | 101747596 A | 6/2010 |
| CN | 103654623 A | 3/2014 |
| CN | 105120977 A | 12/2015 |
| CN | 204973320 U | 1/2016 |
| CN | 105342526 A | 2/2016 |
| DE | DT 1 628 582 | 2/1968 |
| DE | 90 16 939 U1 | 5/1991 |
| DE | 44 15 350 A1 | 11/1995 |
| DE | 296 15 163 U1 | 1/1997 |
| DE | 2001 0049 U1 | 10/2000 |
| DE | 199 19 809 A1 | 11/2000 |
| DE | 199 48 909 A1 | 4/2001 |
| DE | 102 03 460 A1 | 8/2002 |
| DE | 10221694 A1 | 12/2003 |
| DE | 20 2006 020 047 U1 | 10/2007 |
| DE | 10 2006 037 456 A1 | 2/2008 |
| DE | 10 2006 055 890 A1 | 5/2008 |
| DE | 20 2008 003 248 U1 | 6/2008 |
| DE | 20 2008 005 050 U1 | 7/2008 |
| DE | 20 2008 004 733 U1 | 11/2008 |

(Continued)

OTHER PUBLICATIONS

East Bavarian Technical College: construction course in plastics technology East Bavarian Technical University Amberg-Weiden; Study content for the course of plastics technology; downloaded from the internet on May 23, 2019 at https://www.oth-aw.de/studiengaenge-und-bildungsangbote/studienangebote/bachelor-studiengaenge/kunststofftechnik/aufbau/; 10 pages including English translation.

European Standard No. DIN EN 15347: Plastics, Recycled Plastics, Characterisation of Plastics Wastes, English Version; ICS 13.030.50; 83.080.01, Feb. 2008; 12 pages.

Shen, Li et al.; "Open-loop recycling: A LCA case study of PET bottle-to-fibre Yecycling"; Resources, Conservation and Recycling, vol. 55; Nov. 1, 2010 pp. 34-52.

Lueger; Encyclopedia of the entire technology: Staple Fiber 600 (Neuschappe); downloaded from the Internet on Aug. 29, 2019 at http://www.zeno.org/Lueger-1904/A/Stapelfaser: 1920; including English translation.

International Search Report dated May 12, 2017 for International Application No. PCT/EP2017/055781.

(Continued)

*Primary Examiner* — Robert Clemente
(74) *Attorney, Agent, or Firm* — Crowell & Moring LLP

(57) ABSTRACT

The invention relates to a vacuum-cleaner filter bag comprising a wall made of an air permeable material and surrounding an inner chamber, and an inlet opening introduced into the wall. The vacuum-cleaner filter bag is characterized in that the air permeable material comprises at least one layer made from a non-woven fabric and/or a layer made from a fiber web which comprises fibers or is made from fibers which are made from a recycled plastic or a plurality of recycled plastics.

21 Claims, No Drawings

(56) References Cited

FOREIGN PATENT DOCUMENTS

| | | |
|---|---|---|
| DE | 10 2008 046 200 A1 | 4/2009 |
| DE | 202008016836 U1 | 4/2009 |
| DE | 10 2007 062 028 A1 | 6/2009 |
| DE | 20 2008 006 904 U1 | 11/2009 |
| DE | 10 2008 041 227 A1 | 2/2010 |
| DE | 20 2008 018 054 U1 | 6/2011 |
| DE | 10 2010 060 175 A1 | 3/2012 |
| DE | 10 2011 008 117 A1 | 4/2012 |
| DE | 10 2010 060 353 A1 | 5/2012 |
| DE | 10 2011 105 384 A1 | 12/2012 |
| DE | 20 2013 001 096 U1 | 4/2013 |
| DE | 20 2011 052 208 U1 | 5/2013 |
| DE | 20 2013 100 862 U1 | 5/2013 |
| DE | 10 2012 012 999 A1 | 7/2013 |
| DE | 20 2013 103 508 U1 | 10/2013 |
| DE | 10 2014 109 596 A1 | 2/2015 |
| DE | 20 2015 101 218 U1 | 5/2015 |
| DE | 20 2014 100 563 U1 | 6/2015 |
| EP | 0 758 209 A1 | 11/1995 |
| EP | 0 960 645 A2 | 12/1999 |
| EP | 0960645 A2 | 12/1999 |
| EP | 1 198 280 A1 | 1/2001 |
| EP | 1 137 360 A1 | 4/2001 |
| EP | 1 254 693 A2 | 11/2002 |
| EP | 1258277 A1 | 11/2002 |
| EP | 1 480 545 A1 | 9/2003 |
| EP | 1 795 247 A1 | 6/2007 |
| EP | 1 795 427 A1 | 6/2007 |
| EP | 1917895 B1 | 5/2008 |
| EP | 2004303 B1 | 12/2008 |
| EP | 2 011 556 A1 | 1/2009 |
| EP | 2 044 874 A2 | 4/2009 |
| EP | 2 123 206 A1 | 11/2009 |
| EP | 2 263 507 A1 | 12/2010 |
| EP | 2 263 508 A1 | 12/2010 |
| EP | 2 442 703 A1 | 12/2010 |
| EP | 2 301 404 A2 | 3/2011 |
| EP | 2 433 695 A1 | 3/2012 |
| EP | 3 219 373 A1 | 9/2017 |
| EP | 3 219 374 A1 | 9/2017 |
| EP | 3 219 375 A1 | 9/2017 |
| FR | 2 721 188 A1 | 12/1995 |
| WO | WO 01/003802 A1 | 1/2001 |
| WO | WO 03/073903 A1 | 9/2003 |
| WO | WO 07/121979 A1 | 11/2007 |
| WO | WO 11/047764 A1 | 4/2011 |
| WO | WO 11/057641 A1 | 5/2011 |
| WO | WO 13/106392 A2 | 7/2013 |
| WO | WO 2014/074398 A2 | 5/2014 |
| WO | WO 2014/145804 A1 | 9/2014 |

OTHER PUBLICATIONS

Chinese Office Action dated Jun. 3, 2020 on CN Appl. No. 201780029911.9 (Translation attached).

European Standard No. DIN EN 15342: Plastics, Recycled Plastics, "Characterization of Polystyrene (PS) Recyclates," German Version 2007; ICS 13.030.50; 83.080.20; Dec. 2007; 28 pages. (Translation attached).

European Standard No. DIN EN 15344: Plastics, Recycled Plastics, "Characterization of Polyethylene (PE) Recyclates," German Version 2007; ICS 13.030.50; 83.080.20; Dec. 2007; 34 pages. (Translation attached).

European Standard No. DIN EN 15345: Plastics, Recycled Plastics, "Characterization of Polypropylene (PP) Recyclates," German Version 2007; ICS 13.030.50; 83.080.20; Dec. 2007; 28 pages. (Translation attached).

European Standard No. DIN EN 15346: Plastics, Recycled Plastics, "Characterization of Poly (vinyl chloride) (PVC); Recyclates," German Version 2014; ICS 13.030.50; 83.080.20; Nov. 2014; 56 pages. (Translation attached).

European Standard No. DIN EN 15353: Plastics, Recycled Plastics, "Guidelines for the Development of Standards Relating for Recycled Plastics"; German Version CEN/TR 15353:2007; ICS 01.120; 13.030. 50; 83.080.01; (Feb. 2007; 25 pages. (Translation attached).

European Standard DIN EN 15347:2007 (Translation attached).

Ostbayerische Technische Hochschule Amberg-Weiden, "Studieninhalt Studiengang Kunststofftechnik", [gefunded09.09.2020] Fundstelle: [http://www.oth-aw.de/studiengaenge-und-bildungsangbote/studienangebote/bachelor-studiengaenge/kunststofftechnik.studineinhalte/] (Translation attached).

Gutachten zur Auswertung von Recyclingstandards von Prof. Dr.-Ing. H.-J. Endres (May 27, 2020) (Translation attached).

Opinion of Dr. G. Geertz, entitled: "The Analytical Distinctness of Virgin and Recycled Plastic Materials Made of Polypropylene and Polyethylene Terephthalate," submitte din an opposition proceeding of EP Patent No. 3219376 (17 pps.) (May 21, 2021) (English translation included). https://register.epo.org/application?number=EP16178856&lng=en&tab=doclist.

M.R. Mansor, et al., "Thermal and Mechanical Behaviour of Recycled Polypropylene/Polyethylene Blends of Rejected-Unused Disposable Diapers". *Journal of Advanced Manufacturing Technology* (Dec. 2019) (13 pps.).

Romão, et al., "Distinguishing Between Virgin and Post-Consumption Bottle-Grade Poly (Ethylene Terephthalate) Using Thermal Properties," *Polymer Testing 29* (2010), pp. 879-885 (May 18, 2010).

\* cited by examiner

VACUUM CLEANER FILTER BAG MADE FROM RECYCLED PLASTIC

This application claims the benefit under 35 U.S.C. § 371 of International Application No. PCT/EP2017/055781, filed Mar. 13, 2017, which claims the priority of European Patent Application No. 16160922.7, filed Mar. 17, 2016; European Patent Application No. 16160921.9, filed Mar. 17, 2016; and European Patent Application No. 16178856.7, filed Jul. 11, 2016, which are incorporated by reference herein in their entirety.

The present invention relates to a vacuum cleaner filter bag, which is preferably made of recycled plastics.

Filter bags made of nonwoven fabrics have virtually completely replaced paper filter bags in the last ten years due to their significantly better performance characteristics. In particular, the separation efficiency, clogging tendency and mechanical strength were continuously improved. The nonwoven fabrics used for this are usually made of thermoplastic plastics, in particular, polypropylene (PP) and/or polyester (PET).

Even though there is still a need for improving these properties, it is nevertheless noticeable that the high costs of complex filter designs are becoming less and less accepted by the end customer.

Moreover, the use of high-quality and heavy nonwoven fabrics for a disposable product is becoming increasingly critical for ecological reasons.

Biodegradable filter bags, as proposed in EP 2 301 404 and WO 2011/047764, also seems not to be a promising approach for improving ecological properties, as filter bags are often disposed of via waste incineration, and composting is out of the question simply because of the primarily non-biodegradable absorbent material.

Nonwoven fabric filter bags for vacuum cleaners today are always made of several layers (EP 1 198 280, EP 2 433, EP 1 254 693). Support layers are used to achieve the necessary mechanical strength, coarse filter layers that have a high storage capacity for dust without overly increasing air resistance and fine filter layers for the filtration of particles<1 µm.

To increase dust storage capacity, for some years, diffusors and partitions have additionally been inserted into filter bags to optimize the flow capacity in the filter bag, thereby increasing the service life.

To manufacture these different materials, the most diverse technologies are used. As a fine filter layer, mostly meltblown microfiber nonwoven fabrics are used. These meltblown nonwoven fabrics are extrusion nonwoven fabrics mostly made of polypropylene and have filament diameters ranging from less than 1 µm to a few µm. In order to achieve high separation efficiencies, these materials are electrostatically charged (e.g. by means of corona discharge). To further improve the separation efficiency, it was proposed to apply nanofibers produced in the electrospinning process to nonwoven fabric base materials (DE 199 19 809).

Staple fiber nonwoven fabrics, extrusion nonwoven fabrics and fiber webs (EP 1 795 247) made of staple fibers or filaments are used for the capacity level. Polypropylene or polyester also fluff pulp (EP 0 960 645, EP 1 198 280) are usually used as materials for capacity layers.

The use of recycled plastics (e.g. recycled polyethylene terephthalate (rPET)) for fabrics was proposed in WO 2013/106392.

The use of rPET as a raw material for meltblown nonwoven fabrics was already investigated (*Handbook of Nonwovens*, Woodhead Publishing Ltd., Ed. by S. J. Russell, chapter 4.10.1).

CN101747596 describes the use of recycled PET or recycled PBT (rPET/rPBT) as material for microfilaments.

On this basis, it is therefore the object of the present invention to provide vacuum cleaner filter bags, which are in no way inferior to the vacuum cleaner filter bags on the market in terms of dust separation efficiency and service life, and thus have excellent performance characteristics, but mainly consist of recycled materials or waste materials. In particular, it is therefore an object of the present invention to realize vacuum cleaner filter bags that are particularly advantageous both ecologically and economically. Preferably, it is intended to realize a percentage of 40% to 95% recycled materials in the filter bag. Such a filter bag would thus meet the Global Recycled Standard (GRS), v3.

The object is solved by the vacuum cleaner filter bag according to claim 1. The dependent claims represent hereby the advantageous embodiments. Claim 14 further discloses the possibility of using recycled plastics for vacuum cleaner filter bags.

The present invention therefore relates to a vacuum cleaner filter bag, which comprises a wall of an air-permeable material enclosing an interior. The wall has an inlet opening through which, for example, a vacuum cleaner nozzle can be inserted into the vacuum cleaner filter bag. The air-permeable material of the wall comprises at least one layer of a nonwoven fabric and/or one layer of a fiber web, whereby the nonwoven fabric or fiber web comprises or consists of fibers made of one or more recycled plastics.

The term "recycled plastic" used for the purposes of this invention is to be understood as being synonymous with plastic recyclates. For the conceptual definition, reference is made to the standard DIN EN 15347:2007.

The vacuum cleaner filter bag according to this invention comprises a wall made of an air-permeable material, which can have several layers, for example. At least one of these layers is a nonwoven fabric or fiber web, which comprises recycled plastics and is in particular made of recycled plastics. In contrast to the vacuum cleaner filter bags known from the state of the art, less or no fresh/pure (virgin) plastic material is used to produce the nonwoven fabrics or fiber webs underlying the wall of the vacuum cleaner filter bag, but predominantly or exclusively plastics are used that were already in use and have been recovered by appropriate recycling processes. Such filter bags are clearly advantageous from an ecological point of view, as they can be produced to a high degree in a raw material-neutral manner. These filter bags also offer economic advantages, as most recycled plastic materials can be purchased at a lower cost than the corresponding raw materials that are not recycled ("virgin" plastics).

For the purposes of this invention, a nonwoven fabric is a randomly laid web structure, which has undergone a bonding step, such that it has sufficient strength, for example, to be wound or unwound into rolls by machine (i.e. on an industrial scale). The minimum web tension required for winding is 0.25 PLI or 0.044 N/mm. The web tension should not exceed 10% to 25% of the minimum maximum tensile force (according to DIN EN 29073-3:1992-08) of the material to be wound. This results in a minimum maximum tensile force for a wound material of 8.8 N per 5 cm strip width.

A fiber web corresponds to a randomly laid web structure, which, however, has not undergone any solidification step, such that unlike a nonwoven fabric, such a randomly laid web structure does not have sufficient strength, for example, to be wound or unwound into rolls by machine. With regard to the definition of this terminology, reference is made to EP 1 795 427 A1, the disclosure of which is in this regard also incorporated to the subject matter of this patent application.

According to a preferred embodiment, the fibers of the nonwoven fabric or fiber web contained in the air-permeable material of the wall of the vacuum cleaner filter bag according to the invention are made of a single recycled plastic material.

Alternatively, however, it is also preferred if the fibers of the nonwoven fabric or the fiber web are made of different materials, at least one of which being a recycled plastic. Two types in particular are conceivable here:

On the one hand, it can be a mixture of at least two fiber types, for example, fiber mixtures made of at least two different recycled plastics.

On the other hand, it is also possible that the fiber web or the nonwoven fabric contains or is made of bicomponent fibers (BiCo-fibers), which consist of a core as well as a sheath enclosing the core. The core and sheath are made of different materials. In addition to core/sheath bicomponent fibers, the other common variants of bicomponent fibers (e.g. side by side) can also be considered.

The bicomponent fibers can be in the form of staple fibers or as extrusion nonwoven fabrics (e.g. made of meltblown nonwoven fabrics), whereby the bicomponent fibers theoretically have an infinite length and are so-called filaments. With such bicomponent fibers, it is advantageous if at least the core is made of a recycled plastic; for the sheath, for example, a virgin plastic, but alternatively another recycled plastic can also be used.

For the nonwoven fabrics or fiber web for the purposes of the present invention, it is possible that these are dry-laid, wet-laid or extrusion nonwoven fabrics or extrusion fiber webs. As a result, the fibers of nonwoven fabrics or fiber webs can have finite length (staple fibers) or theoretically infinite length (filaments).

Furthermore, it is possible that the air-permeable materials of the wall of the vacuum cleaner filter bag comprise at least one layer of a nonwoven fabric comprising powdery and/or fibrous recycled material from textile manufacturing, in particular cotton textiles, and/or from wool shearing and/or seed fibers. The powdery and/or fibrous recycled material can be, in particular cotton dust. The seed fibers can be cotton linters or kapok fibers.

Such a nonwoven fabric is bonded using bonding fibers, such as fusion fibers or bicomponent fibers, whereby the powdery and/or fibrous recycled material or the seed fibers are bonded. The fusion fibers or the bicomponent fibers preferably comprise at least one recycled plastic. Corresponding nonwoven fabric materials are known, for example, from WO 2011/057641 A1. The nonwoven fabric materials according to the invention can also be developed accordingly.

For example, the air-permeable material can comprise at least one layer of a nonwoven fabric comprising powdery and/or fibrous recycled material from the manufacture of textiles, in particular cotton textiles, and/or from wool shearing and/or seed fibers.

The powdery and/or fibrous recycled material from textile manufacturing is in particular produced while processing textile materials (in particular textile fibers and filaments, as well as linear, flat and three-dimensional textile structures produced therewith), such as the manufacturing (comprising carding, spinning, cutting and drying) or the recycling of textile materials. These powdery and/or fibrous materials are waste materials that can settle on the machines or filter materials used to process the textiles. The powders (or powdery particles) or fibers are normally disposed of and thermally recycled.

The powdery and/or fibrous recycled material is thus, for example, manufacturing waste; this applies particularly to material resulting from the carding, spinning, cutting or drying of textile materials as a waste product. In this case, one also speaks of "pre-consumer waste".

The recycling of textile materials, i.e. the processing (e.g. shredding) of used textile materials or textiles (e.g. old clothes) also produces powdery and/or fibrous recycled material; this is referred to as "post-consumer waste".

The powdery and/or fibrous recycled material from textile manufacturing thus comprise, in particular fibers obtained from waste materials from the textile and clothing industry, from post-consumer waste (textiles and the like) as well as products collected for recycling.

Sheep shearing for wool manufacturing generates short wool fibers as a waste product, which represents a further variant of a powdery and/or fibrous recycled material.

Cotton linters are short cotton fibers that adhere to the cotton seed core after the long seed hair (cotton) has been removed from the core. Cotton linters, [which] are very different in fiber length (typically 1 to 6 mm) and purity, cannot be spun. In the textile industry, they are usually a non-recyclable residue, and thus a waste product. One can distinguish between First Cut (FC-Linters), Second Cut (SC-Linters) and Mill Run. Linters can be cleaned and bleached to obtain Cotton Linters Cellulose (CLC). Cotton linters can also be used for the nonwoven fabrics that can be used in air-permeable materials for the vacuum cleaner filter bags according to the invention. In particular, uncleaned and unbleached FC and/or SC linters can be used.

The powdery and/or fibrous recycled material can be further comminuted before use (e.g. by the known grinding processes (hammer mill, impact mill) or cutting processes), in order to set the desired fiber length distribution.

In the nonwoven fabric layer, which is contained in the air-permeable material, the powdery and/or fibrous recycled material or the seed fibers are bonded. In this respect, the nonwoven fabric material has undergone a bonding step. Bonding the powdery and/or fibrous recycled material and/or the seed fibers is preferably achieved by adding bonding fibers to the nonwoven fabric layer, which can be, for example, thermally activated (thermofusion).

A corresponding nonwoven fabric layer can thus be produced, for example, by depositing the powdery and/or fibrous recycled material and/or the seed fibers together with the bonding fibers in an aerodynamic process and subsequently bonding to the finished nonwoven fabric by thermal activation of the bonding fibers.

Aerodynamic processes are dry processes, as described and defined in section 4.1.3 of the manual *Vliesstoffe* (English: "Nonwoven Fabrics") by H. Fuchs and W. Albrecht, Wiley-VCH, 2nd edition 2012. This section is included here for reference. The deposit of powdery and/or fibrous recycled material and/or seed fibers together with the bonding fibers can be carried out, in particular by means of the airlay or airlaid process. The airlay nonwoven fabric can be made, for example, using a Rando Webber.

In a preferred embodiment, it is provided that the nonwoven fabric layer comprising at least one powdery and/or fibrous recycled material and/or seed fibers comprises or consists of up to 95 wt. %, preferably 70 to 90 wt. % of the powdery and/or fibrous recycled material and/or seed fibers and at least 5 wt. %, preferably 10 to 50 wt. %, of bonding fibers, in particular bicomponent fibers.

The bonding fibers can, for example, be so-called "fusing fibers", which are made of thermoplastic, fusible materials. These fusing fibers melt during thermal activation and bond the powdery and/or fibrous recycled material or seed fibers.

The fusing fibers or bicomponent fibers preferably used as bonding fibers can consist partly or completely of recycled plastics. The bonding fibers can be crimped or smooth. The crimped bonding fibers can be mechanically crimped or self-crimping (e.g. in the form of bicomponent fibers with an eccentric cross-section).

Bicomponent fibers, whose core consists of recycled polyethylene terephthalate (rPET) or recycled polypropylene (rPP), are particularly advantageous. The sheath consists of polypropylene, which can be "virgin" or a recycled material.

In a preferred embodiment, the bonding fibers are staple fibers, in particular with a length of 1 to 100 mm, preferably 2 to 40 mm. The fiber length can be determined according to DIN 53808-1:2003-01.

The recycled plastic is selected from the group consisting of recycled polyesters, in particular recycled polyethylene terephthalate (rPET), recycled polybutylene terephthalate (rPBT), recycled polylactic acid (rPLA), recycled polyglycolide and/or recycled polycaprolactone; recycled polyolefins, in particular recycled polypropylene (rPP), recycled polyethylene and/or recycled polystyrene (rPS); recycled polyvinyl chloride (rPVC), recycled polyamides and mixtures and combinations thereof.

Relevant international standards exist for many plastic recyclates. For PET plastic recyclates, for example, DIN EN 15353:2007 is relevant. PS recyclates are described in more detail in DIN EN 15342:2008. PE recyclates are discussed in DIN EN 15344:2008. PP recyclates are characterized in DIN EN 15345:2008. PVC recyclates are described in more detail in DIN EN 15346:2015. For the purpose of the corresponding particular plastic recyclates, the present patent application adopts the definitions of these international standards. Thereby, the plastic recyclates can be unmetallized. An example of this are plastic flakes or chips recovered from PET beverage bottles. Plastic recyclates can also be metallized, e.g. if the recyclates were obtained from metallic plastic films, in particular metallized PET films (MPET).

The recycled plastic is in particular recycled polyethylene terephthalate (rPET), which was obtained, for example, from beverage bottles, especially from so-called bottle flakes, i.e. pieces of ground beverage bottles.

The recycled plastics, in particular the recycled PET, in both metallized and non-metallized forms, can be spun into the corresponding fibers, from which the corresponding staple fibers or meltblown or spunbond nonwoven fabrics can be produced for the purposes of the present invention.

It is preferred if the air-permeable material is constructed in several layers, wherein at least one, several or all of the layers comprise a nonwoven fabric and/or a fiber web or made thereof, wherein the nonwoven fabric or the fiber web comprises or consists of fibers which are made of a recycled plastic or several recycled plastics.

Overall, the construction of the wall of the filter bag can be designed according to the present invention, as described in EP 1 795 247. Such a wall therefore comprises at least three layers, wherein at least two layers consist of at least one nonwoven fabric layer and at least one fiber web layer containing staple fibers and/or filaments. The wall of the vacuum cleaner filter bag is therefore additionally characterised by a welded joint in which all layers of the filter material are joined together by welded joints. The pressing surface proportion of the welding pattern is a maximum of 5% of the surface of the permeable surface of the filter material or vacuum cleaner filter bag. With regard to the total flowable area of the filter bag, there are on average a maximum of 19 welded joints per 10 $cm^2$.

For example, the air-permeable material may be designed, as described in the introductory part of this patent application, e.g. as described in EP 1 198 280, EP 2 433 695, EP 1 254 693, DE 199 19 809, EP 1 795 247, WO 2013/106 392 or CN 101747596, as long as a plastic recyclate was used for manufacturing these filter materials. With regard to the detailed structure of these filter materials, reference is made to the disclosure of these publications, which in this respect, must also be included in the disclosure of the present invention.

This present invention covers several particularly preferred possibilities for the multi-layer design of the air-permeable material, which are presented below. The majority of these layers can be welded together, in particular as described in EP 1 795 427 A1. The layers can also be glued together or bonded as described in WO 01/003802.

In particular, the invention provides a vacuum cleaner filter bag with a wall of air-permeable material, the material comprising a capacity layer and a fine filter layer,
whereby the capacity layer is a nonwoven of staple fibers produced by an aerodynamic process, the staple fibers are made of one or more recycled plastics, and
wherein the fine filter sheet is a meltblown nonwoven fabric of virgin PP, in particular electrostatically charged, or a meltblown nonwoven fabric of bicomponent fibers having an rPET or rPP core and sheath of virgin PP or virgin PMP, or a support layer of recycled plastic fibers having a layer of nanofibers applied thereto.

Therefore, the capacity layer can correspond to the layer of nonwoven fabric or fiber web already described above.

The staple fibers of the capacity layer may in particular comprise or consist of rPET or rPP.

The term "nanofiber" is used according to the terminology of DIN SPEC 1121:2010-02 (CEN ISO/TS 27687:2009).

The fine filter layer can be arranged in the direction of airflow (from the dirty air side to the clean air side) behind the capacity layer.

Optionally, the vacuum cleaner filter bag can have a(n) (additional) reinforcement layer or support layer in the form of a dried nonwoven fabric layer or in the form of an extrusion nonwoven fabric layer. The dried nonwoven fabric layer may comprise, as described above, powdery and/or fibrous recycled material from textile manufacturing, in particular cotton textiles, and/or from wool shearing and/or seed fibers; alternatively, the dried nonwoven layer may comprise staple fibers of recycled plastics, in particular rPET or rPP. The extrusion nonwoven fabric layer can comprise mono-component or bicomponent filaments of recycled plastic, in particular rPET or rPP.

The reinforcement layer can be located behind the fine filter layer in the direction of airflow.

According to an embodiment, the air-permeable material comprises at least one support layer and at least one fine filter layer, at least one or all of the support layers and/or at least one or all of the fine filter layers being nonwoven fabrics made of one or more recycled plastics.

According to an alternative design, the air-permeable material comprises at least one support layer and at least one capacity layer, at least one or all of the support layers being nonwoven fabrics and/or at least one or all of the capacity layers being nonwoven fabrics or fibrous nonwoven fabrics made of one or more recycled plastics.

A further embodiment provides that the air-permeable material comprises at least one support layer, at least one fine filter layer and at least one capacity layer, at least one or all of the support layers and/or at least one or all of the fine filter layers being nonwoven fabrics made of one or more recycled plastics and/or at least one or all of the capacity layers being nonwoven fabrics or fiber webs made of one or more recycled plastics.

In the aforementioned designs, it is also possible that at least one, preferably all of the capacity layers, comprises or is made of a nonwoven fabric comprising powdery and/or fibrous recycled material and/or seed fibers. The nonwoven fabric layer, which is designed as a capacity layer, has such high mechanical strength that it can also function as a support layer.

It is also possible to make the outer layer on the clean air side from a relatively thin material, based on cotton dust.

The individual layers are described in more detail according to their function.

A support layer (sometimes also called "reinforcement layer"), in the sense of the present invention, is a layer that provides the necessary mechanical strength to the multi-layer composite of the filter material. This is an open, porous nonwoven fabric or a nonwoven with a light basis weight. A support layer is used, among other things, to support other layers or layers and/or to protect them from abrasion. The support layer can also filter the largest particles. The support layer, like any other layer of filter material, may also be electrostatically charged, provided that the material has suitable dielectric properties.

A capacity layer offers high resistance to shock loads, filtering of large dirt particles, filtering of a significant proportion of small dust particles, storage or retention of large amounts of particles, allowing the air to flow easily, resulting in a low pressure drop with high particle loading. This has a particular effect on the service life of a vacuum cleaner filter bag.

A fine filter layer serves to increase the filtration performance of the multi-layer filter material by trapping particles that pass through, for example, the support layer and/or the capacity layer. To further increase the separation efficiency, the fine filter layer can preferably be charged electrostatically (e.g. by corona discharge or hydrocharging), in particular to increase the separation of fine dust particles.

WO 01/003802 provides an overview of the individual functional layers within multi-layer filter materials for vacuum cleaner filter bags The air-permeable material of the wall of the vacuum cleaner filter bag according to the invention can be constructed, as in this patent document, provided that at least one of the layers of the multi-layer filter material for the vacuum cleaner filter bag described there is made of one recycled or several recycled plastics. The disclosure of WO 01/003802 is also included in the present application with regard to the structure of the air-permeable filter materials.

With the aforementioned embodiments, it is advantageous that each support layer is a spunbond nonwoven fabric or scrim, preferably with a grammage of 5 to 80 g/m$^2$, preferably 10 to 50 g/m$^2$, preferably 15 to 30 g/m$^2$ and/or preferably with a titer of the fibers forming the spunbond nonwoven fabric or scrim in the range of 0.5 dtex to 15 dtex.

The air-permeable material can preferably comprise one to three support layers.

In the case of at least two support layers, the total grammage of the sum of all support layers is preferably 10 to 240 g/m$^2$, further preferably 15 to 150 g/m$^2$, further preferably 20 to 100 g/m$^2$, further preferably 30 to 90 g/m$^2$, especially 40 to 70 g/m$^2$.

In particular, it is preferable that all support layers are made of one or more recycled plastics, in particular rPET or rPP.

According to another advantageous embodiment, each fine filter layer is an extrusion nonwoven fabric, in particular a meltblown nonwoven fabric, preferably with a grammage of 5 to 100 g/m$^2$, preferably 10 to 50 g/m$^2$, in particular 10 to 30 g/m$^2$.

It is possible that the air-permeable material comprises 1 to 5 fine filter layers.

In the case of at least two fine filter layers, the total grammage of the sum of all fine filter layers is preferably 10 to 300 g/m2, further preferably 15 to 150 g/m$^2$, in particular 20 to 50 g/m$^2$.

In particular, it is preferable if at least one, preferably all fine filter layers are made of a recycled plastic or several recycled plastics, in particular rPET.

To increase the dust separation efficiency, especially with regard to fine dusts, it is particularly preferred if at least one, preferably all fine filter layers are electrostatically charged.

It is further advantageous if each capacity layer comprises a staple fiber nonwoven fabric, a fiber web or a nonwoven fabric comprising powdery and/or fibrous recycled material from textile manufacturing, in particular cotton textiles, and/or from wool shearing and/or seed fibers, each capacity layer preferably having a grammage of 5 to 200 g/m$^2$, further preferably 10 to 150 g/m$^2$, further preferably 20 to 100 g/m$^2$, in particular 30 to 50 g/m$^2$.

It may be the case that the air-permeable material comprises 1 to 5 capacity layers.

In the case of at least two capacity layers, the total grammage of the sum of all capacity layers is preferably 10 to 300 g/m$^2$, further preferably 15 to 200 g/m$^2$, further preferably 20 to 100 g/m$^2$, especially 50 to 90 g/m$^2$.

A particularly preferred embodiment of the construction of the air-permeable material for the vacuum cleaner filter bag according to the invention provides for the multi-layer construction described below with a layer sequence running outwards (clean air side) from the interior of the vacuum cleaner filter bag (dirty air side):

One support layer, at least one, preferably at least two fine filter layers and another support layer.

Especially in the case that the support layer is constructed as spunbond nonwoven fabric and the fine filter layer as meltblown nonwoven fabric, this structure corresponds to the SMS or SMMS structure for air-permeable filter materials for vacuum cleaner filter bags known from the state of the art.

Alternatively and in particular the following structure is preferred: one support layer, at least one, preferably at least two capacity layers, preferably one further support layer, at least one preferably at least two fine filter layers and one further support layer. In the event that the capacity layer exhibits a high mechanical strength, as described above, the innermost support layer can also be dispensed with.

One or two capacity layers, one or two fine filter layers (meltblown layers), one support layer (spunbond nonwoven fabric).

One or two capacity layers, one or two fine filter layers (melt blown layers), one or two capacity layers.

At least one of the layers comprises at least one recycled plastic material, in particular rPET or rPP. Especially preferred are that at least all support layers are made of recycled plastics.

Each of the aforementioned layers (support layer, capacity layer, fine filter layer) can also be made of a nonwoven fabric material comprising powdery and/or fibrous recycled material from textile manufacturing, in particular cotton textiles, and/or from wool shearing and/or seed fibers.

In a particularly preferred embodiment, this nonwoven fabric material forms the at least one capacity layer, while the other layers do not comprise any powdery and/or fibrous recycled material from textile manufacturing, in particular cotton textiles and/or seed fibers.

All layers of the aforementioned designs can also be joined together using in particular welded joints, as described in EP 1 795 427 A1. However, welded joints are not absolutely necessary.

According to a further embodiment, the vacuum cleaner filter bag has a retaining plate surrounding the inlet opening, which is made of one or more recycled plastics or comprises one or more recycled plastics. In particular, the retaining plate is made of rPET or rPP or comprises a very high proportion of rPET or rPP, for example at least 90 wt. %. According to this embodiment, a further increased proportion of recycled plastics in the vacuum cleaner filter bag is thus possible.

Furthermore, it is possible that at least one flow distributor and/or at least one diffuser are arranged in the interior, whereby preferably the at least one flow distributor and/or the at least one diffuser is made of one or more recycled plastics. Such flow distributors or diffusers are known for example in patent applications EP 2 263 508, EP 2 442 703, DE 20 2006 020 047, DE 20 2008 003 248, DE 20 2008 005 050. The vacuum cleaner filter bags according to the invention, including the flow distributor, can also be designed accordingly.

Flow distributors and diffusers are also preferably made of nonwoven fabrics or laminates of nonwoven fabrics. For these elements, the same materials are preferred, as for the capacity and reinforcement layers.

Another particularly preferred embodiment provides that the proportion by weight of all recycled materials, based on the total weight of the vacuum cleaner filter bag, is at least 25%, preferably at least 30%, preferably at least 40%, preferably at least 50%, preferably at least 60%, preferably at least 70%, preferably at least 80%, preferably at least 90%, in particular at least 95%. Thus, the requirements of the Global Recycled Standard (GRS), v3 (August 2014) of Textile Exchange can be met.

The vacuum cleaner filter bag, according to this invention, can take the form of a flat bag, a side-gusseted bag, a block bottom bag or a 3D bag, such as a vacuum cleaner filter bag for an upright vacuum cleaner. A flat bag has no sidewalls and is made of two layers of material, whereby the two layers of material are directly connected along their circumference, for example, welded or glued. Side-gusseted bags are a modified form of a flat bag and comprise fixed or foldout side gussets. Block bottom bags comprise a so-called block or block bottom, which usually forms the narrow side of the vacuum cleaner filter bag; a retaining plate is usually arranged on this side.

In addition, the present invention relates to the use of recycled plastics, in particular the recycled plastics described above, for example, in the form of nonwoven fabrics and/or fiber webs for vacuum cleaner filter bags. With regard to the recycled plastics that can be used for this purpose or the possible design of the nonwoven fabrics or fiber webs, reference is made in this respect to the above explanations.

This present invention will be explained in more detail using the following exemplary embodiments, without restricting the invention to the special designs shown.

Filter bags are designed with one or more layers of rPET or rPP filaments or rPET or rPP staple fibers. In addition, the filter bags described below may have one or more layers of an aerodynamically formed nonwoven fabric, for example an airlaid nonwoven fabric or an airlay nonwoven fabric, which is made of cotton dust, seed fibers or wool fibers from shearing waste and bicomponent fibers. The different nonwoven fabrics are only suitable for certain material layers. In order to further increase the proportion of recycled raw materials, a retaining plate made of rPET or rPP or at least containing rPET or rPP can also be used. With regard to the individual filter layers:

Spunbond nonwoven fabric layers made of rPET or rPP with a basis weight of 5 to 50 $g/m^2$ and a titer of 1 dtex to 15 dtex are particularly suitable as support layers. PET waste (e.g. chad or punching waste) and bottle flakes, i.e. pieces of ground beverage bottles, are used as raw materials. To overlay the different colors of the waste, it is possible to color the recycled material. The HELIX® (Comerio Ercole) process is particularly advantageous as a thermal bonding process for bonding the spunlaid to a spunbond.

One or more meltblown nonwoven fabric layers of rPET or rPP with a basis weight of 5 to 30 $g/m^2$ each are used as fine filter layers. In addition, one or more meltblown nonwoven fabric layers of virgin PP may be available. At least this/these layer(s) are electrostatically charged by a corona discharge. The layers of rPET or rPP can also be electrostatically charged. It should only be noted that no metallized PET waste is then used for manufacturing. Alternatively, the meltblown filaments can also consist of bicomponent fibers, in which the core is made of rPET or rPP and the sheath of a plastic that can be electrostatically charged particularly well (e.g. virgin PP, PC, PET).

One or more capacity layers contain rPET or rPP staple fibers or rPET or rPP filaments or are produced on the basis of cotton dust (or seed fibers) and bicomponent fibers. Different processes are suitable for producing capacity layers. Carding processes, airlay processes or airlaid processes are commonly used in which staple fibers are first deposited, which are then usually bonded to a nonwoven fabric in one step (e.g. by needling, water jet bonding, ultrasonic calendering, by thermal bonding in the through-flow furnace also by means of bicomponent fibers or bonding fibers, or by chemical bonding, for example with latex, hotmelt, foam binders, etc.). The HELIX® (Comerio Ercole) process is particularly advantageous for calendering. In particular, a Rando Webber system can be used for an airlay process.

A process is also used in which the primary fiber web is not solidified, but rather bonded to a nonwoven fabric with as few welding spots as possible. In both processes, it is possible to use staple fibers made of rPET or rPP. Capacity layers can also be produced as extrusion nonwoven fabrics or extrusion fiber webs. For these nonwoven fabrics, rPET or rPP can also be used without any problems.

The filaments or staple fibers can also consist of bicomponent materials, in which the core is made of rPET or rPP and the sheath is made of a plastic that can be particularly well electrostatically charged (e.g. virgin PP, PC, PET).

Alternatively or in addition, one or more layers of an aerodynamically formed nonwoven may be present, which is made of bicomponent fibers and cotton dust or seed fibers.

The basis weight of the individual capacity layers is preferably between 10 and 100 $g/m^2$.

The capacity layers produced in different ways can, of course, also be combined with each other.

In order to further increase the proportion of recycled material, a retaining plate made of rPET can be used. If the sealing to the vacuum cleaner nozzle is taken over by the bag material, the retaining plate can only consist of rPET or rPP. If the retaining plate has to assume the sealing function, a TPE seal can be injection-molded or adhesively bonded.

By making use of all the possibilities, a proportion of recyclates or waste materials of up to 96% is possible. The following tables provide some examples of concrete embodiments with a recyclate content of 41% to 96%.

The vacuum cleaner filter bags shown below were designed from the various nonwoven fabrics or fiber webs containing the recyclate using the specified materials, the exact composition or structure of which is shown in the following tables. The vacuum cleaner filter bags are flat bags of rectangular geometry having the dimension of 300 mm×280 mm.

EXAMPLE 1

|  | Grammage [g/m²] | Weight per bag [g] | Recyclate content [%] |
| --- | --- | --- | --- |
| Outer support layers | 25 | 4.2 | 100 |
| Meltblown | 15 | 2.5 | 0 |
| Meltblown | 15 | 2.5 | 0 |
| Inner support layer | 17 | 2.9 | 100 |
| Retaining plate |  | 5.0 | 0 |
| Total filter bag |  | 17.1 | 41.3 |

The air-permeable material of the vacuum cleaner filter bag, according to Example 1, has a four-layer structure, whereby the outermost layer (on the clean air side) has a support layer with a gram mage of 25 g/m². The innermost layer is also a support layer with a grammage of 17 g/m². Two layers of a fine filter layer (meltblown nonwoven fabric of virgin polypropylene, each electrostatically charged by corona discharge) with a respective grammage of 15 g/m² are arranged between the two support layers. The support layers are each made of 100% recycled PET. The third column indicates the absolute weight of each layer in the vacuum cleaner filter bag. The vacuum cleaner filter bag has a retaining plate that weighs 5.0 g and is sealed to the vacuum cleaner filter bag.

With such a structure, a 41.3% content of recycled material in the total vacuum cleaner filter bag can be achieved.

EXAMPLE 2

|  | Grammage [g/m²] | Weight per bag [g] | Recyclate content [%] |
| --- | --- | --- | --- |
| Outer support layers | 25 | 4.2 | 100 |
| Meltblown | 15 | 2.5 | 0 |
| Meltblown | 15 | 2.5 | 0 |
| Inner support layer | 17 | 2.9 | 100 |
| Retaining plate |  | 5.0 | 100 |
| Total filter bag |  | 17.1 | 70.5 |

The vacuum cleaner filter bag in Example 2 has the same design as the vacuum cleaner filter bag in Example 1, but with the difference that the retaining plate is made of 100% recycled polyethylene terephthalate (rPET). This measure can increase the recyclate content in the total vacuum cleaner filter bag to 70.5%.

EXAMPLE 3

|  | Grammage [g/m²] | Weight per bag [g] | Recyclate content [%] |
| --- | --- | --- | --- |
| Outer support layers | 25 | 4.2 | 100 |
| Meltblown | 15 | 2.5 | 0 |
| Meltblown | 15 | 2.5 | 100 |
| Inner support layer | 17 | 2.9 | 100 |
| Retaining plate |  | 5.0 | 100 |
| Total filter bag |  | 17.1 | 85.3 |

The vacuum cleaner filter bag according to Example 3 is constructed identically, as in Example 2. A fine filter layer (inner meltblown layer) is formed in contrast to the embodiment of Example 2 or Example 1, this time also made of 100% recycled PET. The rPET used can be metallized or unmetallized. In the event that unmetallized rPET is used, it is also possible to electrostatically charge this meltblown nonwoven fabric, for example by means of corona discharge.

EXAMPLE 4

|  | Grammage [g/m²] | Weight per bag [g] | Proportion of Recyclate [%] |
| --- | --- | --- | --- |
| Outer support layers | 25 | 4.2 | 100 |
| Meltblown | 15 | 2.5 | 85 |
| Meltblown | 15 | 2.5 | 85 |
| Inner support layers | 17 | 2.9 | 100 |
| Retaining plate |  | 5.0 | 100 |
| Total filter bag |  | 17.1 | 95.6 |

The vacuum cleaner filter bag according to Example 4 is identical to the vacuum cleaner filter bag according to Example 2, except that the two fine filter layers (meltblown nonwoven fabric) are made of BiCo-filaments. The core of these meltblown filaments is made of recycled PET, the shell of new (virgin) polypropylene. The core accounts for 85 wt. %.

Such measures achieve a recycled content of 95.6 wt. % relative to the total vacuum cleaner filter bag.

EXAMPLE 5

|  | Grammage [g/m²] | Weight per bag [g] | Proportion of recyclate [%] |
| --- | --- | --- | --- |
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer A | 35 | 5.9 | 50 |
| Capacity layer B | 35 | 5.9 | 50 |
| Inner support layers | 15 | 2.5 | 100 |
| Retaining plate |  | 5.0 | 0 |
| Total filter bag |  | 31.4 | 49.3 |

The wall material of the vacuum cleaner filter bag according to Example 5 has a 7-layer structure. Two fine filter layers (each meltblown nonwoven fabric, as in Example 1) are connected to an outer support layer on the clean air side. A support layer arranged in the middle separates these fine filter layers from two capacity layers A and B, whereby each represents a carded nonwoven fabric of bicomponent staple fibers. For example, 50% of these staple fibers consist of recycled polyethylene terephthalate (rPET), which forms the core of these fibers. The core is surrounded by a sheath of "virgin" PP. Finally, a support layer is arranged on the dirty air side.

In the assembly according to Example 5, all support layers of the air-permeable material are made of recycled PET (rPET). 50% of the capacity layers are made of recycled PET. With such a structure, a content of 49.3 wt. % of recyclate relative to the total vacuum cleaner filter bag is achieved.

EXAMPLE 6

|  | Grammage [$g/m^2$] | Weight per bag [g] | Recyclate Content [%] |
|---|---|---|---|
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer A | 35 | 5.9 | 100 |
| Capacity layer B | 35 | 5.9 | 100 |
| Inner support layer | 15 | 2.5 | 100 |
| Retaining plate |  | 5.0 | 0 |
| Total filter bag |  | 31.4 | 68.0 |

The vacuum cleaner filter bag according to Example 6 has the same embodiment as Example 5. Unlike the embodiment according to Example 5, the capacity layers A and B are this time also 100% made of a carded staple fiber nonwoven fabric of rPET staple fibers.

With such an embodiment, a content of 68.0 wt. % of recyclate relative to the entire vacuum cleaner filter bag is achieved.

EXAMPLE 7

|  | Grammage [$g/m^2$] | Weight per bag [g] | Recyclate content [%] |
|---|---|---|---|
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer A | 35 | 5.9 | 100 |
| Capacity layer B | 35 | 5.9 | 100 |
| Inner support layer | 15 | 2.5 | 100 |
| Retaining plate |  | 5.0 | 100 |
| Total filter bag |  | 31.4 | 83.9 |

In the vacuum cleaner filter bag according to Example 7, the retaining plate is this time also made of 100% recycled PET. Incidentally, the embodiment of the vacuum cleaner filter bag is identical to that of Example 6.

With such a structure, a total content of 83.9 wt. % of recyclate relative to the total vacuum cleaner filter bag is achieved.

EXAMPLE 8

| Voluminous Nonwoven Fabric 70 300 mm × 280 mm | Grammage [$g/m^2$] | Weight per bag [g] | Recyclate content [%] |
|---|---|---|---|
| Outer support layers | 25 | 4.2 | 100 |
| Meltblown | 15 | 2.5 | 80 |
| Meltblown | 15 | 2.5 | 80 |
| Middle support layer | 17 | 2.9 | 100 |
| Capacity layer A | 35 | 5.9 | 100 |
| Capacity layer B | 35 | 5.9 | 100 |
| Inner support layer | 15 | 2.5 | 100 |
| Retaining plate |  | 5.0 | 100 |
| Total filter bag |  | 31.4 | 96.8 |

The embodiment of the vacuum cleaner filter bag according to Example 8 is identical to that of Example 7, except for the fact that the two fine filter layers (meltblown nonwoven fabric layers) are also made to a high proportion of recycled PET. The meltblown is made of a bicomponent meltblown with a core of rPET coated with new polypropylene.

The proportion of rPET is 80 wt. % relative to the total mass of the meltblown nonwoven fabric, which forms the respective fine filter layer.

With such an embodiment, a total content of 96.8 wt. % of recycled materials relative to the total filter bag can be achieved.

EXAMPLE 9

|  | Grammage [$g/m^2$] | Weight per bag [g] | Recyclate content [%] |
|---|---|---|---|
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer C | 35 | 5.9 | 80 |
| Capacity layer D | 35 | 5.9 | 80 |
| Inner support layer | 15 | 2.5 | 100 |
| Retaining plate |  | 5.0 | 0 |
| Total filter bag |  | 31.4 | 60.5 |

The vacuum cleaner filter bag according to Example 9 is also made of a 7-layer air-permeable material. The construction of the vacuum cleaner filter bag is similar to that of the vacuum cleaner filter bag shown in Example 5. The support layers and the fine filter layers (meltblown nonwoven fabric layers) are identical to those in Example 5. The capacity layers C and D are made of a nonwoven material, 80 wt. % of which is made of cotton dust or seed fibers and 20% from BiCo bonding fibers. This nonwoven material is described in detail in WO 2011/057641 A1. The proportion of cotton dust or seed fibers in the capacity layers is added to the total proportion of recycled material.

With such a design, a proportion of recycled material, i.e. the sum of recycled plastics, as well as cotton dust or seed fibers of 60.5 wt. % relative to the total vacuum cleaner filter bag is achieved.

EXAMPLE 10

|  | Grammage [g/m²] | Weight per bag [g] | Recyclate content [%] |
|---|---|---|---|
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer A | 35 | 5.9 | 100 |
| Capacity layer D | 35 | 5.9 | 80 |
| Inner support layer | 15 | 2.5 | 100 |
| Retaining plate |  | 5.0 | 0 |
| Total filter bag |  | 31.4 | 64.3 |

The vacuum cleaner filter bag according to Example 10 is constructed analogously to the vacuum cleaner filter bag according to Example 9. The outer capacity layer corresponds to a capacity layer according to Examples 6 to 8, i.e. a carded staple fiber nonwoven fabric consisting of 100% recycled PET fibers. The recyclate content of a finished vacuum cleaner filter bag is 64.3 wt. %.

EXAMPLE 11

|  | Grammage [g/m²] | Weight per bag [g] | Recyclate content [%] |
|---|---|---|---|
| Outer support layers | 25 | 4.2 | 100 |
| Meltblown | 15 | 2.5 | 0 |
| Meltblown | 15 | 2.5 | 0 |
| Middle support layer | 17 | 2.9 | 100 |
| Capacity layer C | 35 | 5.9 | 80 |
| Capacity layer D | 35 | 5.9 | 80 |
| Inner support layer | 15 | 2.5 | 100 |
| Retaining plate |  | 5.0 | 100 |
| Total filter bag |  | 31.4 | 76.4 |

The vacuum cleaner filter bag according to Example 11 corresponds to a vacuum cleaner filter bag according to Example 9, with the difference that the retaining plate is made of 100% rPET. The total content of recycled materials in this vacuum cleaner filter bag is 76.4 wt. %.

EXAMPLE 12

|  | Grammage [g/m²] | Weight per bag [g] | Recyclate content [%] |
|---|---|---|---|
| Outer support layers | 25 | 4.2 | 100 |
| Meltblown | 15 | 2.5 | 80 |
| Meltblown | 15 | 2.5 | 80 |
| Middle support layer | 17 | 2.9 | 100 |
| Capacity layer C | 35 | 5.9 | 80 |
| Capacity layer D | 35 | 5.9 | 80 |
| Internal support layers | 15 | 2.5 | 100 |
| Retaining plate |  | 5.0 | 100 |
| Total filter bag |  | 31.4 | 89.3 |

The vacuum cleaner filter bag according to Example 12 corresponds to the vacuum cleaner filter bag according to Example 11, with the difference that the two fine filter layers are designed according to the fine filter layers according to Example 8 and are thus made of a bicomponent meltblown nonwoven fabric with a core of rPET and a sheath of polypropylene. The total content of recyclate of such a vacuum cleaner filter bag is 89.3 wt. %.

The invention claimed is:

1. A vacuum cleaner filter bag comprising an interior-enclosing wall of an air-permeable material and an inlet opening introduced into the wall, wherein
the air-permeable material comprises at least one layer of a nonwoven fabric or one layer of a fiber web comprising or consisting of fibers made of one or several recycled plastics, and
wherein the recycled plastics are spun into said fibers by melting the recycled plastics and extruding the molten recycled plastics into said fibers.

2. The vacuum cleaner filter bag according to claim 1, wherein the recycled plastic is selected from the group consisting of recycled polyesters; recycled polyolefins; recycled polyvinyl chloride (rPVC), recycled polyamides and mixtures and combinations thereof.

3. The vacuum cleaner filter bag according to claim 1, wherein the air-permeable material has a multilayer construction, wherein at least one, several or all of the layers comprise a nonwoven fabric or a fiber web or are made thereof, wherein the nonwoven fabric or the fiber web comprises or consists of fibers made of a recycled plastic or several recycled plastics.

4. The vacuum cleaner filter bag according to claim 1, wherein the air-permeable material comprises a capacity layer and a fine filter layer,
wherein the capacity layer is a nonwoven fabric of staple fibers produced by an aerodynamic process, the staple fibers are made of one or several recycled plastics, and
wherein the fine filter layer is a meltblown nonwoven fabric of virgin polypropylene (PP), or a meltblown nonwoven fabric of bicomponent fibers having a recycled polyethylene terephthalate (rPET) or rPP core and a sheath of virgin PP or virgin polymethylpentene (PMP), or a support layer of recycled plastic fibers having a layer of nanofibers applied thereto.

5. The vacuum cleaner filter bag according to claim 1, wherein the air-permeable material comprises
at least one support layer and at least one fine filter layer, at least one or all of the support layers or at least one or all of the fine filter layers being nonwoven fabrics made of one or more recycled plastics,
or
at least one support layer and at least one capacity layer, at least one or all of the support layers being nonwoven fabrics or at least one or all of the capacity layers being nonwoven fabrics or fiber nonwoven fabrics made of one or more recycled plastics,
or
at least one support layer, at least one fine filter layer and at least one capacity layer, wherein at least one or all of the support layers or at least one or all of the fine filter layers are nonwoven fabrics made of one or more recycled plastics or at least one or all of the capacity layers are nonwoven fabrics or fiber webs made of one or more recycled plastics.

6. The vacuum cleaner filter bags according to claim 5, wherein
a) each support layer is a spunbond nonwoven fabric or scrim,
b) the air-permeable material comprises 1 to 3 support layers, c) in the case of the presence of at least two support layers, the total grammage of the sum of all support layers is 10 to 240 g/m², or
(d) all support layers are made of one or more recycled plastics.

7. The vacuum cleaner filter bag according to claim 5, wherein
a) each fine filter layer is an extrusion nonwoven fabric,
b) the air-permeable material comprises 1 to 5 fine filter layers,
c) in the case of the presence of at least two fine filter layers, the total grammage of the sum of all fine filter layers is 10 to 300 g/m²,
d) at least one, preferably all fine filter layers are made of one or more recycled plastics, or
e) at least one, preferably all fine filter layers are electrostatically charged.

8. The vacuum cleaner filter bag according to one of claims 5, wherein
a) each capacity layer comprises a staple fiber nonwoven fabric, a fiber web or a nonwoven fabric comprising powdery or fibrous recycled material from textile manufacturing,
b) the air-permeable material comprises 1 to 5 capacity layers, or
c) in the case of the presence of at least two capacity layers, the total grammage of the total of all capacity layers is 10 to 300 g/m².

9. The vacuum cleaner filter bag according to claim 1, wherein the air-permeable material is formed in several layers with a layer sequence viewed from an interior of the vacuum cleaner filter bag:
one support layer, at least one fine filter layers and another support layer,
or
one support layer, at least one capacity layers, preferably one further support layer, at least one fine filter layers and one further support layer.

10. The vacuum cleaner filter bag according to claim 1, wherein the vacuum cleaner filter bag comprises a retaining plate surrounding the inlet opening made of one or more recycled plastics or comprising one or more recycled plastics.

11. The vacuum cleaner filter bag according claim 1, wherein at least one flow distributor or at least one diffuser are arranged in an interior.

12. The vacuum cleaner filter bag according to claim 1, wherein a proportion by weight of all recycled materials relative to a total weight of the vacuum cleaner filter bag is at least 25%.

13. The vacuum cleaner filter bag according to claim 1, wherein the vacuum cleaner filter bag comprises a flat bag, a block bottom bag or a 3D bag.

14. The vacuum cleaner filter bag according to claim 2, wherein the recycled polyesters are selected from recycled polyethylene terephthalate (rPET), recycled polybutylene terephthalate (rPBT), recycled polylactic acid (rPLA), recycled polyglycolide or recycled polycaprolactone; and wherein the recycled polyolefins are selected from recycled polypropylene (rPP), recycled polyethylene or recycled polystyrene (rPS).

15. The vacuum cleaner filter bag according to claim 6, wherein when each support layer is the spunbond nonwoven fabric or scrim, the spunbond nonwoven fabric or scrim comprises a grammage of 5 to 80 g/m2 or a titer of fibers forming the spunbond nonwoven fabric or scrim is in the range of 0.5 dtex to 1 5 dtex.

16. The vacuum cleaner filter bag according to claim 6, wherein when all the support layers are made of one or more recycled plastics, the recycled plastic comprises rPET.

17. The vacuum cleaner filter bag according to claim 7, wherein when at least one fine filter layer is made of one or more recycled plastics, the recycled plastic comprises rPET.

18. The vacuum cleaner filter bag according to claim 8, wherein when each capacity layer comprises a staple fiber nonwoven fabric, a fiber web or a nonwoven fabric comprising powdery or fibrous recycled material from textile manufacturing, the powdery or fibrous recycled material comprises cotton textiles or seed fibers.

19. The vacuum cleaner filter bag according to claim 11, wherein the at least one flow distributor or the at least one diffuser is made of one or more recycled plastics.

20. The vacuum cleaner filter bag according to claim 12, wherein the proportion by weight of all recycled materials relative to the total weight of the vacuum cleaner filter bag is at least 95%.

21. A method of producing a vacuum cleaner filter bag, the vacuum cleaner filter bag comprising an interior-enclosing wall of an air-permeable material and an inlet opening introduced into the wall, the air-permeable material comprising at least one layer of a nonwoven fabric and/or one layer of a fiber web, the method comprising:
spinning one or more recycled plastics into fibers by melting the one or more recycled plastics and extruding molten recycled plastics into the fibers; and
forming the at least one layer of a nonwoven fabric and/or one layer of a fiber web using the fibers.

* * * * *